2,785,187
Patented Mar. 12, 1957

2,785,187
MANUFACTURE OF DIHYDROXYDIBENZANTHRONE

Richard J. Dombrowski, Buffalo, N. Y., assignor to Allied Chemical & Dye Corporation, New York, N. Y., a corporation of New York No Drawing. Application June 1, 1954,
Serial No. 433,797

8 Claims. (Cl. 260—355)

This invention relates to an improved process for making 16,17-dihydroxydibenzanthrone, an intermediate for the manufacture of jade green, 16,17-dimethoxydibenzanthrone (Colour Index 1101).

The customary method of making 16,17-dihydroxydibenzanthrone consists in simultaneously condensing and oxidizing 2,2'-dibenzanthronyl in sulfuric acid with manganese dioxide, separating the resulting 16,17-dioxodibenzanthrone by filtration and treating the washed product in aqueous suspension with sodium bisulfite. It has also been proposed to prepare the product by oxidation of dibenzanthrone in sulfuric acid with nitric acid, dilution of the reaction mixture, and treatment of the diluted mass with sodium bisulfite.

In accordance with the present invention, 16,17-dihydroxydibenzanthrone is obtained by oxidizing 2,2'-dibenzanthronyl in strong sulfuric acid solution to form 16,17-dioxodibenzanthrone, treating the resulting reaction mixture with a metal above silver in the electromotive series to reduce the 16,17-dioxodibenzanthrone, and separating the resulting 16,17-dihydroxydibenzanthrone from the reaction mixture.

The oxidation step of the process may be conveniently carried out with manganese dioxide as the oxidizing agent in a sulfuric acid medium of 80–90% $H_2SO_4$ (by weight) concentration. Addition of water to the oxidation reaction product to provide an acid of lower concentration, particularly to about 70–75% $H_2SO_4$ (by weight) during the subsequent reduction, improves the filterability of the final product but is not necessary to the satisfactory performance of the process. The reduction step may conveniently be carried out with a metal powder, such as powdered aluminum, zinc, iron or copper, conveniently in an aqueous reduction medium containing at least about 70% $H_2SO_4$. It is advantageous to add the metal by increments while maintaining the temperature between about 10° and about 15° C. to prevent undue violence of reaction during the reduction step. After the reduction, the product may be heated to dissolve all excess metal, preferably after dilution with water, and the resulting mixture may be filtered to separate a high purity 16,17-dihydroxydibenzanthrone in excellent yield.

The process of the invention provides substantially higher yields of 16,17-dihydroxydibenzanthrone than previously known processes and the quality of the product is excellent. These results have been confirmed by comparative tests involving conversion of the dihydroxy compound in known manner to 16,17-dimethoxydibenzanthrone. Yields of dyestuff 32% greater per initial unit weight of dibenzanthronyl charge have been obtained compared to yields by the previously known processes. Moreover, the color of the resulting dyestuff prepared by the process of the invention is uniformly superior to that prepared from the dihydroxy product of previously known processes.

The following examples illustrate my invention; parts being by weight:

Example 1.—Preparation of dihydroxydibenzanthrone by reducing dioxobenzanthrone slurry with aluminum powder.—The aluminum powder used was a pigment grade powder containing at least 97% aluminum metal and having a particle size distribution such that 100% passes through a U. S. standard No. 100 sieve, at least 88% passes through a U. S. No. 170 sieve, and at least 70% passes through a U. S. No. 200 sieve.

The manganese dioxide was a Moroccan pyrolusite having a minimum strength, as $MnO_2$, of 80% and a particle size such that 95% of the material passed through a U. S. No. 170 sieve.

Manganese dioxide (scale weight 400 parts) was charged to 96% sulfuric acid (5100 parts) in an agitated vessel at 25° C. The resultant slurry was agitated for 1 hour at 105–110° C. and then allowed to cool. With temperature in the acid mixture maintained between 20° and 40° C., water (543 parts) was added to cut the acid strength to 87%. 2,2'-dibenzanthronyl (265 parts) was charged to the agitated slurry in increments over a 6-hour period with temperature in the mixture at 10–20° C. for the first 3 hours and at 25–35° for the second 3 hours.

By this treatment the 2,2'-dibenzanthronyl was oxidized to 16,17-dioxodibenzanthrone. Completeness of the oxidation was determined by microscopic examination of the crystals in the reaction mixture.

After completion of the oxidation, the reaction mass was cooled to 10–15° C. and agitated in that temperature range while aluminum powder (20 parts), in relatively equal portions, about ½ part aluminum powder every 12 minutes, was added to the mixture. Throughout the period wherein the aluminum powder was charged, a stream of nitrogen gas was directed onto the surface of the slurry to exclude atmospheric oxygen. Evolution of hydrogen gas from the surface of the slurry occurred after about ⅓ of the total aluminum had been charged.

After addition of the last portion of aluminum powder, the batch was agitated for about 16 hours at 10–15° C. Thereafter a spectroscopic examination of a representative portion of the reduction mass indicated that substantially all of the dioxodibenzanthrone was reduced to dihydroxydibenzanthrone. The manganese dioxide had been substantially consumed and dissolved in the acid.

The reaction mass was then drowned in 20,000 parts water at 60–65° C. The resultant agitated slurry was heated to and maintained for 1 hour at 90–95° C., and then diluted with sufficient additional water to bring the total acidity to 7% in order to facilitate subsequent filtration. During this treatment excess aluminum powder dissolved in the hot aqueous acid.

The slurry was allowed to cool to about 70° C. and filtered. The filter cake was washed first with cold water, then with hot water until acid free. Thereafter it was partially dried by blowing with air. The filter cake weighed 1445 parts and contained 292.5 parts of solids, of which 7.2% was inorganic ash. The yield of organic matter recovered was 271.4 parts, or 102.5 parts per 100 parts 2,2'-dibenzanthronyl charged.

The quality of dihydroxydibenzanthrone thus obtained was evaluated by methylating the compound to form dimethoxydibenzanthrone, and mixing the latter in the usual manner with a dispersing agent and assistants to form a green vat-dye paste substantially like the commercial paste form of the dyestuff identified as Colour Index No. 1101. The dyestuff paste so prepared was compared with a recognized commercial paste of the same dyestuff for evaluation of important characteristics such as content of color solids, stability of dispersion, coloring power, shade, etc.

Filter cakes obtained by the process of Example 1 may be converted to dimethoxydibenzanthrone by treatment with dimethyl sulfate according to a process such as is described in U. S. P. 1,531,262 or by treatment with methyl p-toluene sulfonate by a process such as is described in Fiat Final Report 1313, volume 2, pages 86–7.

Methylation of the dihydroxydibenzanthrone filter cakes with dimethyl sulfate gives an average yield of 98.6 parts (gross weight) of crude dimethoxydibenzanthrone per 100 parts (ash free basis) of crude dihydroxydibenzanthrone.

To prepare a vat dye paste, 1 part of crude dimethoxydibenzanthrone is dissolved in 9 parts of 90% sulfuric acid and the mass is drowned in 40 parts of water and filtered. The wet filter cake, containing about 25% solids, is admixed and dispersed by mechanical working with an amount of Tamol NNO (a condensation product of formaldehyde and naphthalene sulfonic acid) corresponding to 4% by weight, and sodium carbonate, corresponding to 1.25% by weight of the dispersed mass. The dispersion is adjusted by dilution as with water or glycerine or diethylene glycol to a specific content of dimethoxydibenzanthrone per 100 parts paste.

The overall recovery of dimethoxydibenzanthrone vat dye paste from a given charge of 2,2'-dibenzanthronyl processed by the method of Example 1 averages 132% of the recovery obtained when the same 2,2'-dibenzanthronyl is processed under altogether comparable conditions by a prior art method, involving use of sodium bisulfite as a reducing agent, substantially as described in Example 1 of U. S. P. 1,866,501.

The quality of vat dye paste obtained by the process of Example 1 is uniformly excellent as to brightness, shade, dispersibility, dyeing strength, padding strength, and printing shade and strength.

In contrast to these characteristics of the product of this invention, the product obtained under comparable conditions from such processes of prior art as that of Example 1 of U. S. P. 1,866,501 is often blue and/or dull in shade. Moreover, the process of the present invention requires but one filtration whereas that of U. S. P. 1,866,501 requires two filtrations and is therefore less efficient and more costly.

When the process of the above example was repeated employing the various metal powders indicated below as reducing agents, the indicated quantities of dihydroxydibenzanthrone filter cake were obtained for each 100 parts of 2,2'-dibenzanthronyl charged:

*Example 2.*—Aluminum (20 parts 100% through 100 mesh)—102.3 parts.

*Example 3.*—Zinc (40 parts 100% through 200 mesh)—102.2 parts.

*Example 4.*—Iron (U. S. P. grade 65 parts 100% through 325 mesh)—111.5 parts.

*Example 5.*—Copper (65 parts 90% through 325 mesh)—104.3 parts.

Upon methylation with methyl paratoluene sulfonate each of the filter cakes yielded a vat dye paste of quality superior to that of the dyestuff prepared from 16,17-dihydroxydibenzanthrone made by aqueous sodium bisulfite reduction of dioxodibenzanthrone as described in the prior art.

While I have illustrated my invention by specific examples, it should be understood that they are not intended to limit the scope of the invention which is defined in the appended claims wherein I claim:

1. The process of making 16,17-dihydroxydibenzanthrone, which comprises oxidizing 2,2'-dibenzanthronyl in a sulfuric acid medium of 80% to 90% $H_2SO_4$ concentration by weight, to form 16,17-dioxodibenzanthrone, treating the reaction mixture with a metal above silver in the electromotive series to reduce the 16,17-dioxodibenzanthrone, and separating the resulting 16,17-dihydroxydibenzanthrone from the reaction mixture.

2. The process of claim 1 in which an excess of said metal in finely divided form is employed in an aqueous sulfuric acid reduction medium having a concentration at least about 70% $H_2SO_4$, the reduction product is diluted with water, and the resulting dilute reduction product is heated until the excess metal is dissolved and is then filtered to separate the 16,17-dihydroxydibenzanthrone.

3. The process of claim 1 wherein the oxidation is effected by manganese dioxide.

4. The process of claim 1 wherein said metal is aluminum.

5. The process of claim 1 wherein the oxidation is effected by manganese dioxide and said metal is aluminum.

6. The process of claim 2 wherein the oxidation is effected by manganese dioxide.

7. The process of claim 2 wherein said metal is aluminum.

8. The process of claim 2 wherein the oxidation is effected by manganese dioxide and said metal is aluminum.

References Cited in the file of this patent

UNITED STATES PATENTS

| | | |
|---|---|---|
| 1,866,501 | Howell | July 5, 1932 |
| 1,910,603 | Goodrich et al. | May 23, 1933 |
| 2,028,117 | Wuertz | Jan. 14, 1936 |
| 2,075,456 | Neresheimer et al. | Mar. 30, 1937 |

FOREIGN PATENTS

| | | |
|---|---|---|
| 259,370 | Germany | Apr. 24, 1913 |